I. R. Shank,
Meal Bin,
No 24,890,
Patented July 26, 1859.
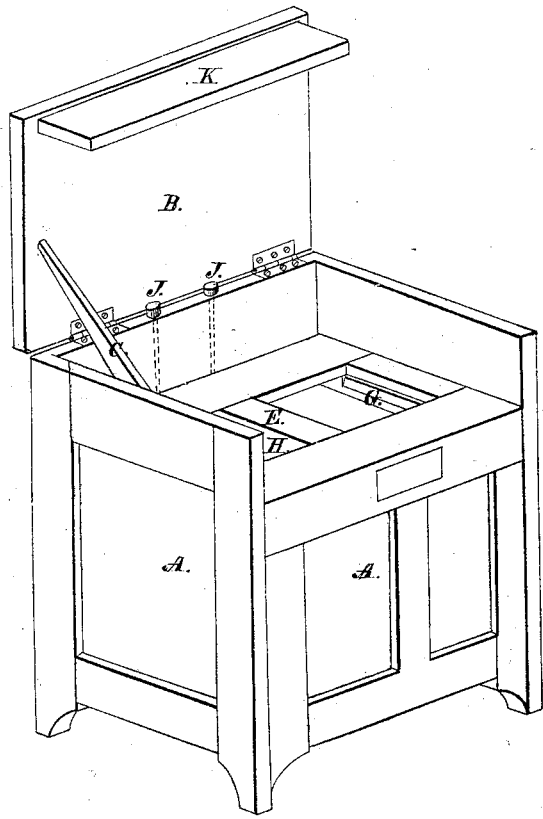
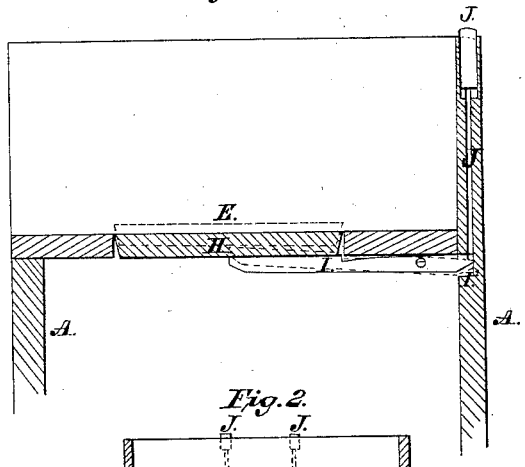
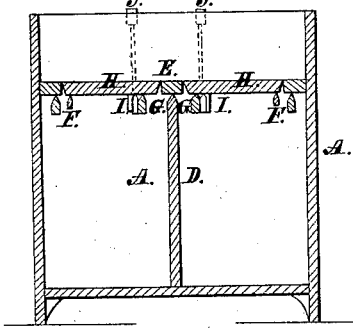
Attest:
Inventor:

UNITED STATES PATENT OFFICE.

ISAAC R. SHANK, OF BUFFALO, VIRGINIA.

BISCUIT-BOARD.

Specification of Letters Patent No. 24,890, dated July 26, 1859.

*To all whom it may concern:*

Be it known that I, ISAAC R. SHANK, of Buffalo, in the county of Putnam and State of Virginia, have invented a new and useful Improvement in Biscuit-Boards; and I do hereby declare that the following is a full, clear, and exact description thereof, reference being had to the accompanying drawings, and to the letters of reference marked thereon, of which—

Figure 1, exhibits a perspective view of the chest with the lid raised showing the top of the boards. Fig. 2, is a vertical section through the same showing the interior arrangement. Fig. 3, is a view of the manner of operating the lever for raising the boards.

The nature of my invention consists in arranging within a chest and at a convenient height from the floor, a board which is provided with trap doors resting upon slats having beveled edges and operated so as to be readily opened, by levers and pins hereinafter described.

A, represents the chest which has a cover B, hinged to the back of the chest and held back when opened by the stick C. This chest is divided into two compartments by a partition D, beveled on its upper end, and upon this rests the biscuit board E. This board also rests upon beveled crosspieces F, F, placed at either end of the chest and is strengthened by battons G, G, which are also beveled where they pass across the opening covered by the two trap boards H, H. This beveling of the pieces as above described, prevents the flour from gathering upon their surfaces which would necessarily prevent the boards shutting down close, at the same time they serve as a solid and firm foundation for the boards. On the sides of the two center battons G, G, are screwed two levers I, I, which project out a short distance from the board E, and pass into mortises I', in the back of the chest, the other ends rest against the bottom of the trap boards H, H. These levers I, I, are operated so as to raise the ends of the boards so that they can be taken hold of and lifted off by two vertical pins J, J, which pass down the back of the chest and rest upon the ends of the levers, and by pressing upon these pins the boards are raised as above stated. These trap boards H, are tapered on their edges so that they can be removed easily from the biscuit board. The front of the chest is open above the biscuit board in order to have free access thereto and the portion K, which is attached to the cover closes this opening and also the whole top of the chest securely.

This arrangement above described forms a complete and a very convenient acquisition to the furniture of a kitchen and serves as a receptacle for keeping flour and meal while at the same time by raising the cover is found a board for kneading and cutting dough.

What I claim as my invention and desire to secure by Letters Patent, is,

The arrangement and combination of trap boards H, H, beveled strips G, G, levers I, I, and vertical pins J, substantially in the manner and for the purposes herein above set forth.

ISAAC R. SHANK.

Witnesses:
PETER J. WHITE,
CHAS. W. TIMMS.